US008880578B2

(12) United States Patent
Porel et al.

(10) Patent No.: US 8,880,578 B2
(45) Date of Patent: Nov. 4, 2014

(54) HARDWARE INDEPENDENT SIMPLE NETWORK MANAGEMENT PROTOCOL BASED ON A GENERIC DATA COLLECTION SCHEME

(75) Inventors: Partha Protim Porel, Kolkata (IN); Somnath Roy, Kolkata (IN); Tanmoy Sil, Kolkata (IN)

(73) Assignee: LSI Corporation, Milpitas, CA (US)

( * ) Notice: Subject to any disclaimer, the term of this patent is extended or adjusted under 35 U.S.C. 154(b) by 1245 days.

(21) Appl. No.: 11/654,057

(22) Filed: Jan. 16, 2007

(65) Prior Publication Data

US 2008/0133765 A1 Jun. 5, 2008

(30) Foreign Application Priority Data

Dec. 1, 2006 (IN) .............................. 2232/CHE/2006

(51) Int. Cl.
*G06F 15/16* (2006.01)

(52) U.S. Cl.
USPC ............................. 709/202; 709/217; 709/230

(58) Field of Classification Search
CPC .............. H04L 29/08072; H04L 29/06; H04L 29/08135; H04L 41/0213; H04L 41/0233
USPC ................... 709/223, 230, 202, 217
See application file for complete search history.

(56) References Cited

U.S. PATENT DOCUMENTS

| | | | | |
|---|---|---|---|---|
| 6,003,077 A * | 12/1999 | Bawden et al. | ............... | 709/223 |
| 6,272,537 B1 * | 8/2001 | Kekic et al. | .................. | 709/223 |
| 6,549,943 B1 * | 4/2003 | Spring | ....................... | 709/223 |
| 6,633,909 B1 * | 10/2003 | Barrett et al. | ................. | 709/224 |
| 6,832,247 B1 * | 12/2004 | Cochran et al. | ............... | 709/223 |
| 7,200,651 B1 * | 4/2007 | Niemi | .......................... | 709/223 |
| 7,451,201 B2 * | 11/2008 | Alex et al. | ..................... | 709/223 |
| 7,533,173 B2 * | 5/2009 | Badovinatz et al. | .......... | 709/226 |
| 7,577,943 B2 * | 8/2009 | Chilimbi et al. | .............. | 717/130 |
| 8,024,488 B2 * | 9/2011 | Salowey et al. | .................... | 710/5 |
| 8,037,471 B2 * | 10/2011 | Keller et al. | .................... | 717/174 |
| 8,219,664 B2 * | 7/2012 | Sahinoja et al. | .............. | 709/224 |
| 8,543,681 B2 * | 9/2013 | Bearden et al. | ............... | 709/224 |
| 2002/0124078 A1 * | 9/2002 | Conrad | ....................... | 709/224 |
| 2002/0147764 A1 * | 10/2002 | Krupczak | ..................... | 709/202 |
| 2003/0069956 A1 * | 4/2003 | Gieseke et al. | .............. | 709/223 |
| 2003/0177214 A1 * | 9/2003 | Chen et al. | .................... | 709/223 |
| 2004/0006619 A1 * | 1/2004 | Syed et al. | ..................... | 709/224 |
| 2005/0010660 A1 * | 1/2005 | Vaught | ......................... | 709/223 |
| 2005/0091646 A1 * | 4/2005 | Chilimbi et al. | .............. | 717/130 |
| 2005/0262229 A1 * | 11/2005 | Gattu et al. | ..................... | 709/223 |
| 2006/0106925 A1 * | 5/2006 | Song et al. | ..................... | 709/223 |
| 2006/0212558 A1 * | 9/2006 | Sahinoja et al. | .............. | 709/223 |

* cited by examiner

*Primary Examiner* — Jimmy H Tran
(74) *Attorney, Agent, or Firm* — Raj Abhyanker, P.C.

(57) ABSTRACT

A method and/or a system for a generic agent in a managed network are disclosed. In one embodiment, a method of a generic simple network management protocol (SNMP) module on a network node includes communicating with a device succeedingly coupled to the network node using a data collector module assigned to the device. The method also includes translating data passed between the device and a management module managing the device based on a simple network management protocol.

20 Claims, 8 Drawing Sheets

HARDWARE INDEPENDENT SIMPLE NETWORK MANAGEMENT PROTOCOL BASED ON A GENERIC DATA COLLECTION SCHEME

FIELD OF TECHNOLOGY

This disclosure relates generally to the technical fields of network management and, in one example embodiment, to a method and/or a system for hardware independent simple network management protocol based on a generic data collection scheme.

BACKGROUND

A Simple Network Management Protocol (SNMP) may be an application layer protocol that facilitates an exchange of a management information between network devices (e.g., thereby enabling network administrators to manage a performance of a network, deal with problems of the network, and/or plan for a growth of the network).

A SNMP managed network may consist of a managed device, a SNMP agent of the managed device, and/or a network-management system (NMS). The managed device (e.g., routers, access servers, switches, bridges, hubs, computer hosts, and/or printers) may be a network node (e.g., the SNMP managed network) that contains the SNMP agent. The managed device may collect and/or store the management information of the managed device and/or make the management information available to the NMS using the SNMP.

The SNMP agent may have a local knowledge of the management information and/or may translate the management information into a form compatible with the SNMP. The NMS may execute an application that monitors and/or controls the managed device. The NMS may provide a bulk of processing and/or memory resources required for a network management.

Different types of SNMP agents may be needed to interface with different types of devices and/or different Operating Systems (OS). Developing the different types of SNMP agents may involve rigorous development and/or maintenance activities. In addition, any change in an implementation of the device may require a change and/or an update in the SNMP agent. Furthermore, the network may use up more memory space to load the different types of SNMP agents that may be needed to support the different types of devices. Accordingly, these requirements may incur more developmental cost, time, manpower, etc.

SUMMARY OF THE INVENTION

A method and/or a system for hardware independent simple network management protocol based on a generic data collection scheme is disclosed. In one aspect, a method of a generic simple network management protocol (SNMP) module (e.g., the generic SNMP module is agnostic to a change of a management information base (MIB) of the device) on a network node includes communicating with a device succeedingly coupled to the network node using a data collector module assigned to the device. The method also includes translating a data passed between the device and a management module managing the device based on a simple network management protocol.

The method also may include processing a configuration file (e.g., the configuration file is stored in a platform independent file format including at least a XML format, an ini format, and a binary format) to fetch data of the device based on a query data of the management module. In addition, the method may include comprising collecting instances of an object of the device using the data collector module.

Moreover, the method may include configuring the generic SNMP module to perform at least one of communicating a particular trap data to a particular device succeedingly coupled to the network node and traversing all devices subsequently coupled to the network node with the particular trap data (e.g., where the configuring the generic SNMP module is performed through encoding a trap scheme in the configuration file). The method may further include generating a new configuration file and a new data collector module of a new device when the new device is coupled to the network node.

In another aspect, a method of a data collector module (e.g., the data collector module is based on a simple object-oriented structure) associated with a generic simple network management protocol (SNMP) module includes loading the data collector module based on at least an object name and a data collector module name defined in a configuration file. The method also includes communicating with a device having an object matching the object name to access the object using the data collector module.

The method may include caching object instances of the object using the data collector module. The method may also include comprising creating a thread associated with the data collector module to monitor an occurrence of an event in the device through a polling mechanism. In addition, the method may include communicating an alert data to the generic SNMP module when a data associated with the occurrence exceeds a threshold value.

In yet another aspect, a system includes a management module to communicate a management data with a device coupled to the management module through a network. The system also includes a generic simple network management protocol (SNMP) module agnostic to a management information base (MIB) (e.g., where the generic SNMP module is agnostic to a change in a management information base of each member of devices hosting the generic SNMP module such that the generic SNMP module provides a universal SNMP interface to the each member of devices) of the device to enable an interface between the management module and the device. Furthermore, the system includes a data collector module (e.g., wherein the data collector module is a plug-in which interacts with the generic SNMP module to process the management data) to access the device based on the management data when the generic SNMP module loads the data collector module.

The system may also include a configuration module to select the data collector module of at least one of a particular device and a particular object of the particular device. The system may further include a trap module to generate a trap data associated with the device to alert the management module of an event exceeding a threshold value (e.g., where the generic SNMP module and at least one non-generic SNMP module to concurrently operate on the device such that the at least one non-generic SNMP module operates in the device when the configuration file does not include information data of the device).

The methods, systems, and devices disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

A method and/or a system for hardware independent simple network management protocol based on a generic data collection scheme are disclosed. In the following description, for the purposes of explanation, numerous specific details are set forth in order to provide a thorough understanding of the various embodiments. It will be evident, however to one skilled in the art that the various embodiments may be practiced without these specific details.

In one embodiment, a method of a generic simple network management protocol (SNMP) module (e.g., the generic SNMP module 108 of FIG. 1) on a network node includes communicating with a device (e.g., a device 106 of FIG. 1) succeedingly coupled to the network node using a data collector module (e.g., a data collector module 112 of FIG. 1) assigned to the device. The method also includes translating a data passed between the device and a management module managing the device based on a simple network management protocol.

Figure 1:
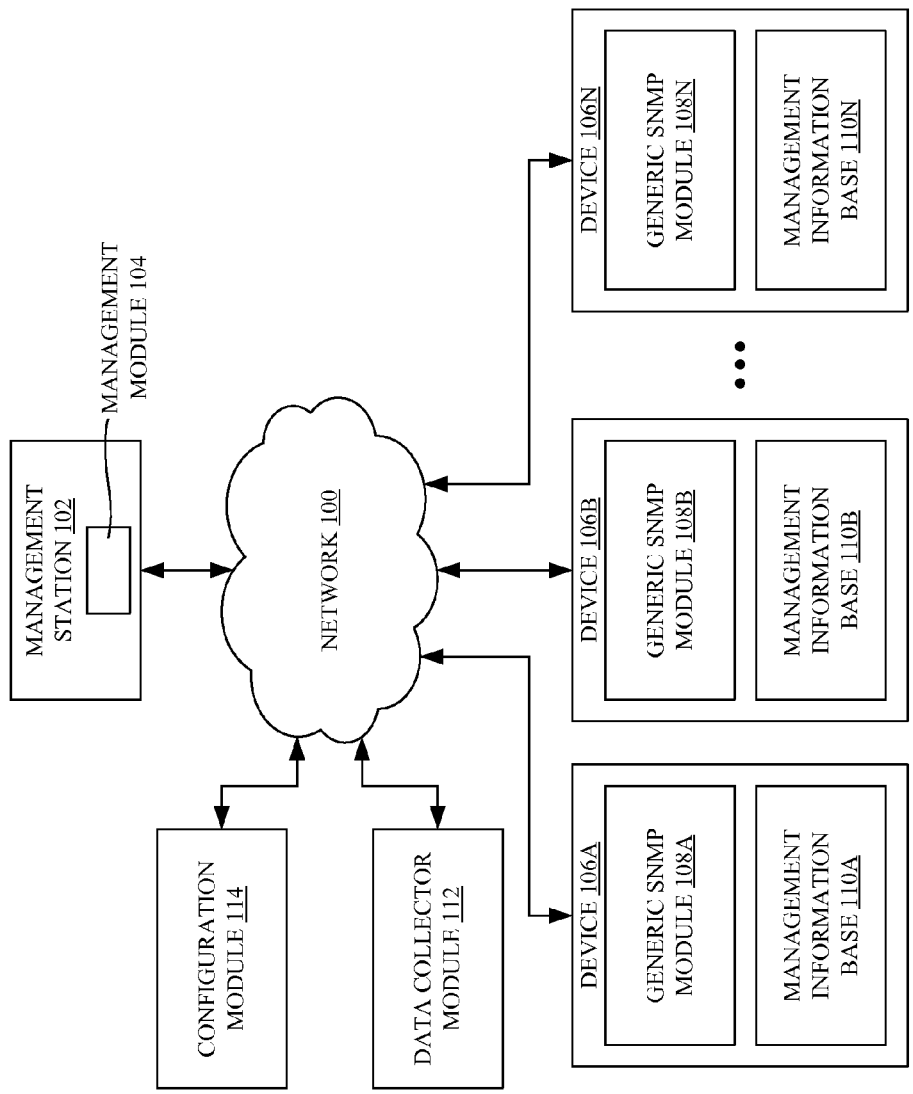
FIG. 1 is a system view of a generic simple network management protocol (GNMP) module communicating with a management module and a data collector module, according to one embodiment.

In another embodiment, a method of a data collector module (e.g., the data collector module 112 of FIG. 1) associated with a generic simple network management protocol (SNMP) module (e.g., the generic SNMP module 108 of FIG. 1) includes loading the data collector module based on at least an object name (e.g., an object name 202 of FIG. 2) and a data collector module name (e.g., a data collector module name 204 of FIG. 2) defined in a configuration file (e.g., a configuration module 114 of FIG. 1). The method also includes communicating with a device having an object (e.g., an object 206 of FIG. 2) matching the object name to access the object using the data collector module.

In yet another embodiment, a system includes a management module (e.g., a management module 104 of FIG. 1) to communicate a management data with a device coupled to the management module through a network (e.g., a network 100 of FIG. 1). The system further includes a generic simple network management protocol (SNMP) module agnostic to a management information base (MIB) (e.g., a MIB 110 of FIG. 1) of the device to enable an interface between the management module and the device and a data collector module to access the device based on the management data when the generic SNMP module loads the data collector module.

Also, the method may be in a form of a machine-readable medium embodying a set of instructions that, when executed by a machine, cause the machine to perform any method disclosed herein. It will be appreciated that the various embodiments discussed herein may/may not be the same embodiment, and may be grouped into various other embodiments not explicitly disclosed herein. It will be appreciated that the various embodiments discussed herein may/may not be the same embodiment, and may be grouped into various other embodiments not explicitly disclosed herein.

FIG. 1 is a system view of the generic simple network management protocol (GNMP) module 108 communicating with the management module 104 and the data collector module 112, according to one embodiment. Particularly, in FIG. 1 illustrates a network 100, a management station 102, the management module 104, the device 106, the generic SNMP module 108, the MIB 110, the data collector module 112, and/or the configuration module 114.

The management station 102 may be a console through which a network administrator performs network management functions. The management module 104 may be an application program of the management station 102 which implements a SNMP (e.g., which may be a Layer 7 protocol and/or an application layer protocol that is used by the network management module for monitoring network-attached devices for conditions that warrant administrative attention). The device 106 may be a network element (e.g., a router, a server, a switch, a bridge, a hub, a computer host, and/or a printer) which collects and stores management information and make this information available to the management module 104 using the SNMP.

The generic SNMP module 108 may be a software and/or hardware which serves any request directed to the device 106 under a particular object identifier (OID) such that a user of the network may not need to change a code of the generic SNMP module 108 every time the MIB 110 changes and/or to support a new MIB. The management information base 110 may be a collection of definitions which define properties of objects (e.g., managed) in the device 106 to be managed (e.g., where the device 106 may keep a database of values for each of the definitions written in the MIB 110).

Figure 2:
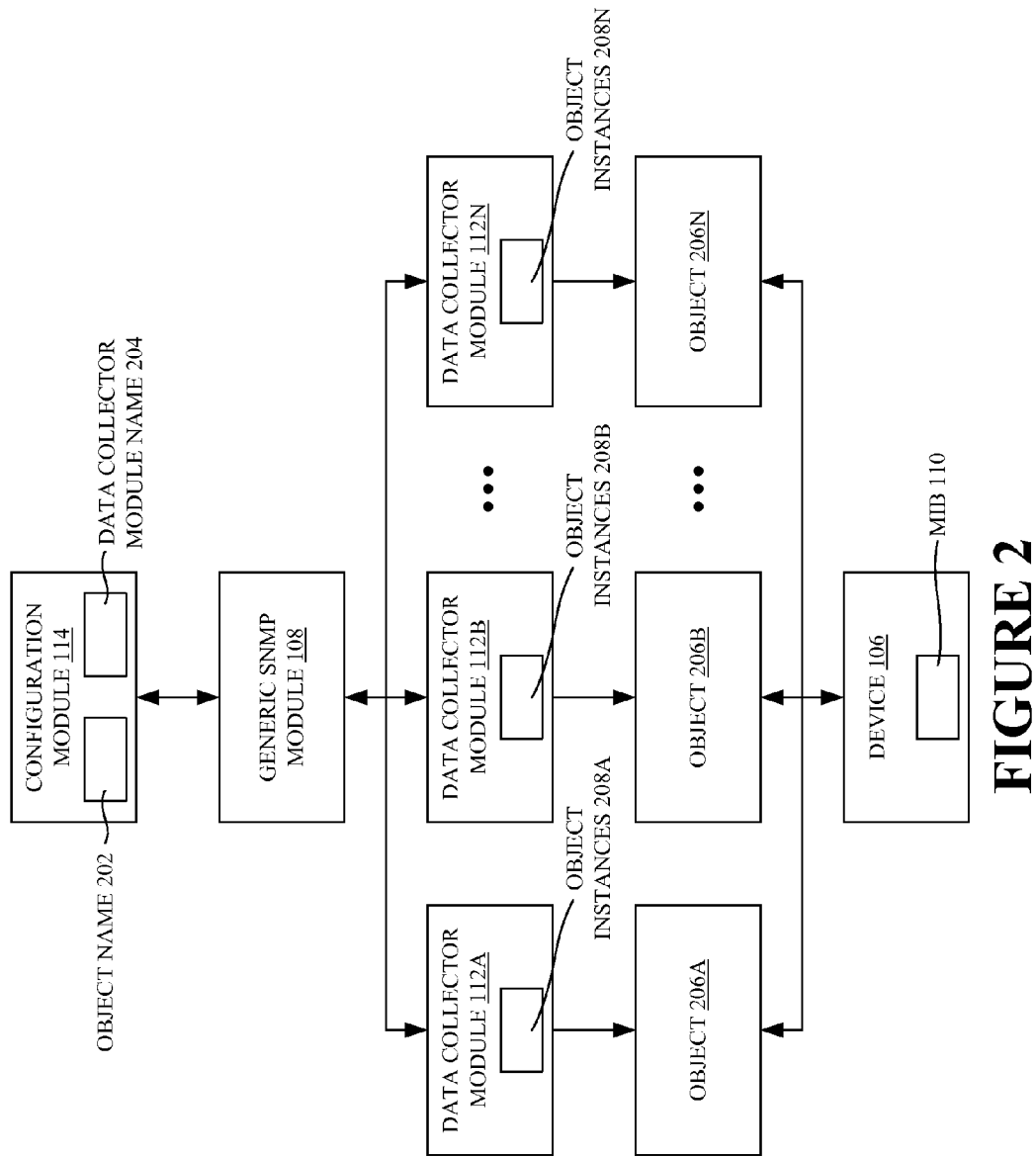
FIG. 2 is an interaction diagram of the generic GNMP module of FIG. 1 communicating with a device using the data collector module of FIG. 1, according to one embodiment.

The data collector module 112 may be a software program (e.g., and/or a hardware circuitry) based on a simple object-oriented structure to cache object instances (e.g., object instance(s) 208 of FIG. 2) of an object (e.g., an object 206 of FIG. 2) in the device 106. The configuration module 114 may be a configuration file (e.g., in XML, ini, binary, and/or in any other platform independent file format) used to preserve all MIB attributes and property information of the device 106.

For example, as illustrated in FIG. 1, the management module 104 of the management station 102 may communicate a management data (e.g., a query data to monitor and/or control the device 106, a response data based on the query data, a trap data, etc.) to and/or from the device 106 through the network 100. The generic SNMP module 108 may be uniform across the device(s) 106 (e.g., 106A, 106B, and/or 106N). The MIB 110 may contain a unique set of objects (e.g., object(s) 206 of FIG. 2) for a corresponding device (e.g., the device 106). The generic SNMP module 108 may process the configuration module 114 to obtain a configuration data (e.g., the object name 202 of FIG. 2, the data collector module name 204, attribute(s) of the MIB 110, etc.) and load the data collector module 112.

Furthermore, the generic SNMP module 108 on a network node may communicate with the device 106 succeedingly coupled to the network node using the data collector module 112 assigned to the device 106 and/or may translate a data passed between the device 106 and the management module 104 managing the device 106 based on a simple network management protocol. The configuration module 114 may be processed to fetch data of the device 106 based on a query data of the management module 104. The configuration module 114 may be stored in a platform independent file format including at least a XML format, an ini format, and/or a binary format.

The generic SNMP module 108 may be configured to perform at least one of communicating a particular trap data (e.g., data to test for a particular condition in a running program) to a particular device (e.g., the device 106) succeedingly coupled to the network node and traversing all devices subsequently coupled to the network node with the particular trap. A new configuration file and a data collector module of a new device may be generated when the new device is coupled to the network node. The generic SNMP module 108 may be agnostic to a change of the MIB 110 of the device 106.

A management data (e.g., a query data, a response data, a control data, a trap data, etc.) may be communicated between the management module 104 and the device 106 coupled to the management module 104 through the network 100. An interface between the management module 104 and the device 106 may be enabled using the generic SNMP module 108 agnostic to the MIB 110 of the device 106. The device 106 based on the management data may be accessed using the data collector module 112 when the generic SNMP module 108 loads the data collector module 112.

The data collector module 112 may be a plug-in which interacts with the generic SNMP module 108 to process the management data. The generic SNMP module 108 may be agnostic to a change in the MIB 110 of each member of devices (e.g., the device 106) hosting the generic SNMP module 108 such that the generic SNMP module 108 provides a universal SNMP interface to the each member of devices.

FIG. 2 is an interaction diagram of the generic GNMP module 108 of FIG. 1 communicating with the device 106 using the data collector module 112 of FIG. 1, according to one embodiment. Particularly, in FIG. 2 illustrates the object name 202, the data collector module name 204, the object 206, and/or the object instance(s) 208.

For example, as illustrated in FIG. 2, the object name 202 may be a specific object identifier (OID) which may be searched by the generic SNMP module 108 of FIG. 1 to fetch information including at least a scalar and/or tabular attribute, a class, am access type, and/or a data type of the object 206. The data collector module name 204 may be used to call a particular data collector module (e.g., the data collector module 112 of FIG. 1) to get respective values of a property of the object 206 (e.g., which has a value). The object 206 may be a hardware, a configuration parameter, a performance statistic, etc. which directly relate to a current operation of the device 106. The object instance(s) 208 may be reside at leaf nodes of the MIB tree (e.g., as in FIG. 3).

Furthermore, the object instances 208 of the device 106 may be collected using the data collector module 112 of FIG. 1. The data collector module 112 may be loaded based on at least the object name 202 and the data collector module name 204 defined in the configuration module 114 of FIG. 1. The object 206 using the data collector module 112 may be accessed through communicating between the data collector module 112 and the device 106 having the object 206 matching the object name 202. The object instances 208 of the object 206 may be cached using the data collector module 112.

The data collector module 112 of at least one of a particular device and a particular object of the particular device may be selected based on the configuration module 114 of FIG. 1. The generic SNMP module 108 of FIG. 1 and at least one non-generic SNMP module may concurrently operate on the device 106 such that the at least one non-generic SNMP module may operate in the device 106 when the configuration module 114 does not include information data of the device 106.

Figure 3:
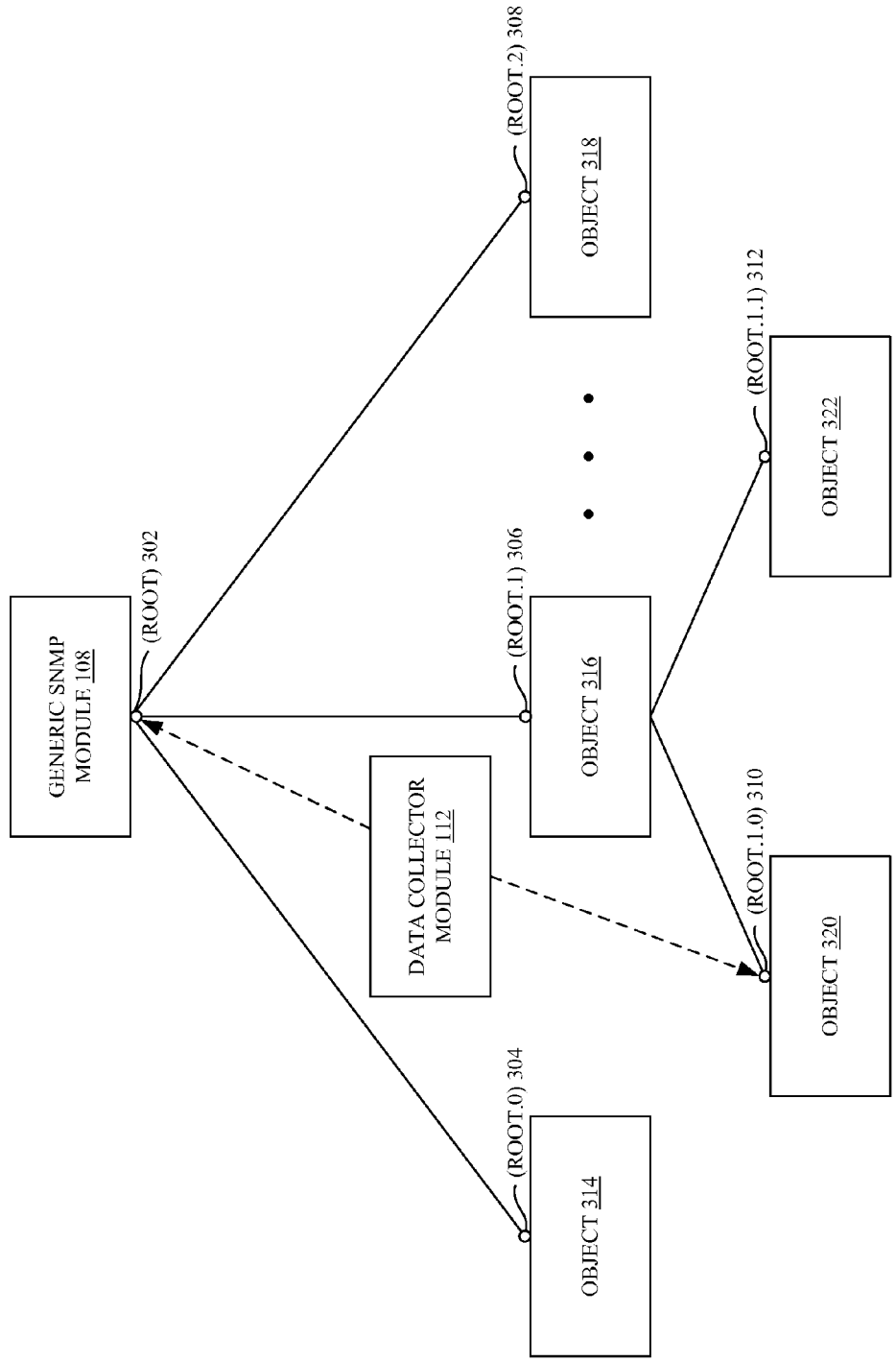
FIG. 3 is a tree diagram illustrating how an object of the device in FIG. 2 interacts with the generic GNMP module of FIG. 1, according to one embodiment.

FIG. 3 is a tree diagram illustrating how the object 206 of the device 106 in FIG. 2 interacts with the generic GNMP module 108 of FIG. 1, according to one embodiment. Particularly, in FIG. 1 illustrates a root 302, a root.0 304, a root.1 306, a root.2 308, a root.1.0 310, a root.1.1 312, an object 314, an object 316, an object 318, an object 320, and/or an object 322.

The root 302 may indicate an object identifier (OID) of the generic SNMP module 108 of FIG. 1 such that all SNMP requests for all objects and/or devices subsequent to the OID of the generic SNMP module 108 may be served by the generic SNMP module 108. The root.0 304 may be an OID of an object 314 (e.g., where the base OID of LSI Logic is 1.3.6.1.4.1.3582). The root.1 306 may be an OID of an object 316. The root.2 308 may be an OID of an object 318. The root.1.0 310 may be an OID of an object 320. The root.1.1 312 may be an OID of an object 322.

For example, as illustrated in FIG. 3, the generic SNMP module 108 of FIG. 1 may invoke the data collector module 112 based on the object name 202 of FIG. 2 and the data collector module name 204 in the configuration module 114 to collect object instance(s) 208 of the object 320. Furthermore, the data collector module 112 may be based on a simple object-oriented structure.

Figure 4:
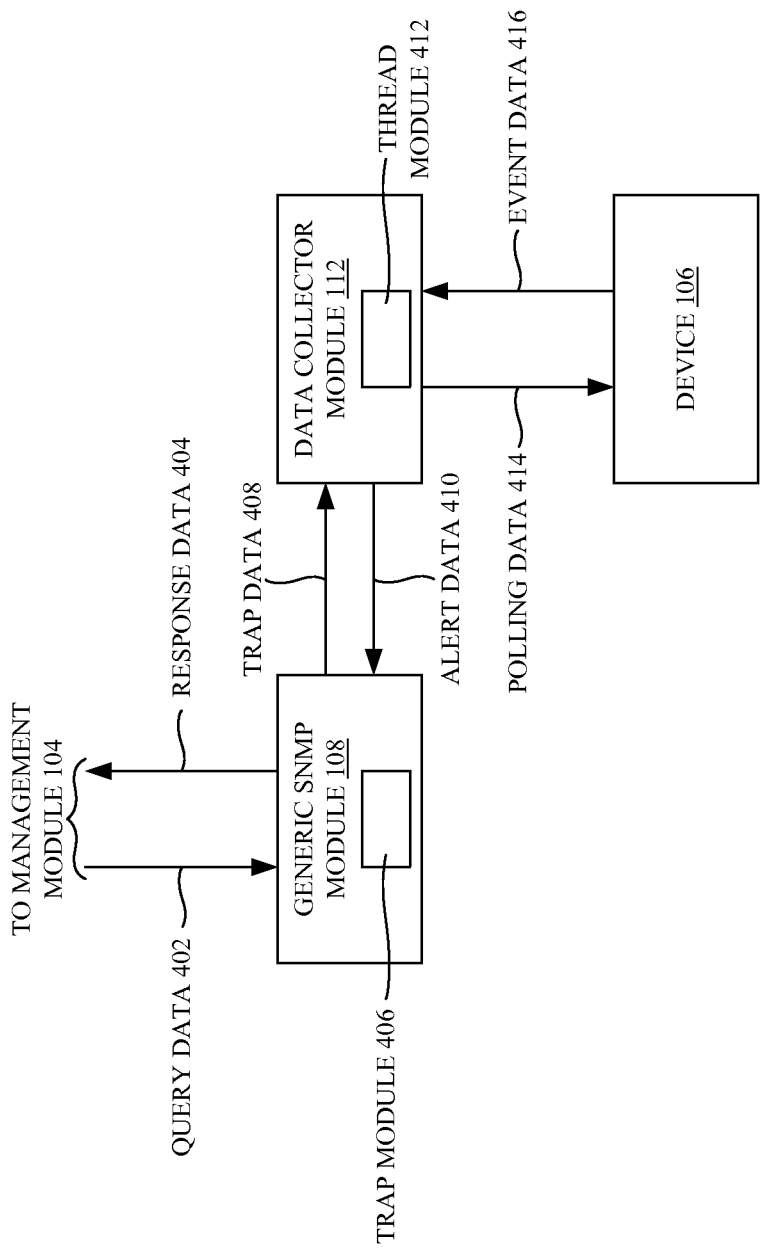
FIG. 4 is a transaction diagram of the generic GNMP module of FIG. 1, the data collector module, and the device with respect to a trap scheme, according to one embodiment.

FIG. 4 is a transaction diagram of the generic GNMP module 108 of FIG. 1, the data collector module 112, and the device 106 with respect to a trap scheme, according to one embodiment. Particularly, in FIG. 4 illustrates a query data 402, a response data 404, a trap module 406, a trap data 408, an alert data 410, a thread module 412, a polling data 414, and/or an event data 416.

The query data 402 of the management module 104 of FIG. 1 may be used to monitor (e.g., using a read command such as get and getnext) and/or control (e.g., using a write command such as set) the device 106. The response data 404 of the generic SNMP module 108 may be generated to report (e.g., asynchronously) events to the management module 104. The trap module 406 (e.g., which may be a part of the configuration module 114 of FIG. 1) of the generic SNMP module 108 may generate the trap data 408 (e.g., targeting the device 106).

The trap data 408 may be generated by the trap module 406 to capture errors in the device 106 (e.g., and/or reveal where the errors are). The alert data 410 may be generated by the thread module 412 (e.g., which may be a part of the configuration module 114) when there is an event in the device 106 to report to the management module 104. The thread module 412 may be a software and/or hardware algorithm to continue poll the device 106 to detect an event. The polling data 414 may be generated by the thread module 412 to continuously monitor the device 106 (e.g., for an event). The event data 416 may be generated by the device 106 to notify the thread module 412 of an occurrence of an event.

For example, as illustrated in FIG. 1, the thread module 412 of the data collector module 112 may communicate (e.g., through generating the polling data 414 and/or processing the event data 416) with the device 106 to monitor an occurrence of an event in the device 106. The thread module 412 of the data collector module 112 of FIG. 1 may generate the alert data 410 when there is an event to report. The alert data 410 may prompt the trap module 406 to generate the response data 404 to report the occurrence of the event in the device 106 (e.g., and/or in the object 206 of FIG. 2) to the management module 104.

Furthermore, a trap scheme may be encoded in the configuration module 114 associated with the generic SNMP module 108. A thread associated with the data collector module 112 may be created to monitor an occurrence of an event in the device 106 through a polling mechanism. An alert data (e.g., the alert data 410) may be communicated to the generic SNMP module 108 when a data associated with the occurrence exceeds a threshold value. The trap module 406 may generate the response data 404 associated with the device 106 to alert the management module 104 of an event exceeding a threshold value.

Figure 5:
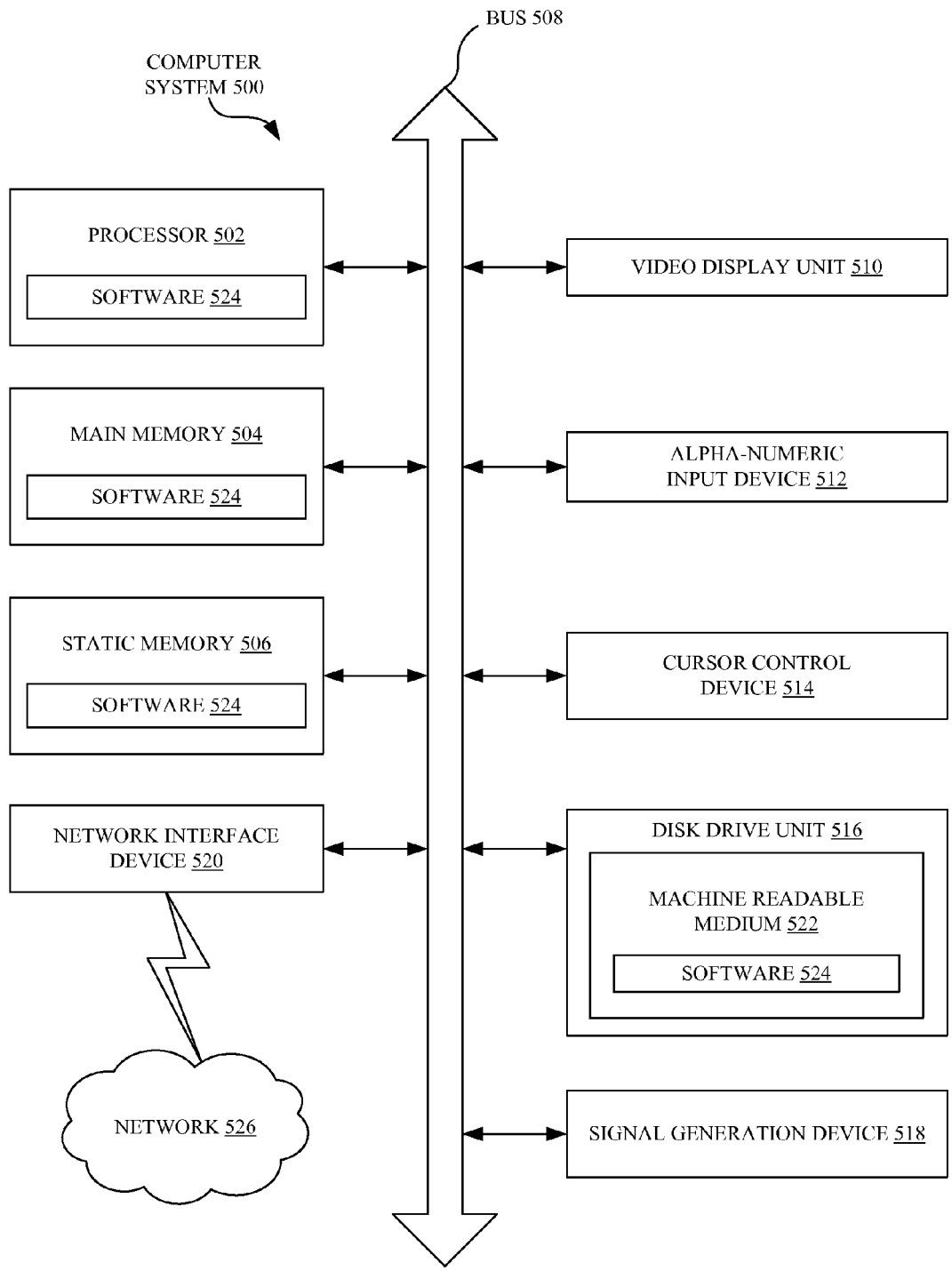
FIG. 5 is a diagrammatic representation of a data processing system capable of processing a set of instructions to perform any one or more of the methodologies herein, according to one embodiment.

FIG. 5 is a diagrammatic representation of a data processing system capable of processing a set of instructions to perform any one or more of the methodologies herein, according to one embodiment.

In various embodiments, the machine operates as a standalone device and/or may be connected (e.g., networked) to other machines. In a networked deployment, the machine may operate in the capacity of a server and/or a client machine in server-client network environment, and/or as a peer machine in a peer-to-peer (or distributed) network environment.

The machine may be a personal computer (PC), a tablet PC, a set-top box (STB), a Personal Digital Assistant (PDA), a cellular telephone, a web appliance, a network router, switch and/or bridge, an embedded system and/or any machine capable of executing a set of instructions (sequential and/or otherwise) that specify actions to be taken by that machine. Further, while only a single machine is illustrated, the term "machine" shall also be taken to include any collection of machines that individually and/or jointly execute a set (or multiple sets) of instructions to perform any one and/or more of the methodologies discussed herein.

The example computer system 500 includes a processor 502 (e.g., a central processing unit (CPU) a graphics processing unit (GPU) and/or both), a main memory 504 and a static memory 506, which communicate with each other via a bus 508. The computer system 500 may further include a video display unit 510 (e.g., a liquid crystal display (LCD) and/or a cathode ray tube (CRT)). The computer system 500 also includes an alphanumeric input device 512 (e.g., a keyboard), a cursor control device 514 (e.g., a mouse), a disk drive unit 516, a signal generation device 518 (e.g., a speaker) and a network interface device 520.

The disk drive unit 516 includes a machine-readable medium 522 on which is stored one or more sets of instructions (e.g., software 524) embodying any one or more of the methodologies and/or functions described herein. The software 524 may also reside, completely and/or at least partially, within the main memory 504 and/or within the processor 502 during execution thereof by the computer system 500, the main memory 504 and the processor 502 also constituting machine-readable media.

The software 524 may further be transmitted and/or received over a network 526 via the network interface device 520. While the machine-readable medium 522 is shown in an example embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" shall also be taken to include any medium that is capable of storing, encoding and/or carrying a set of instructions for execution by the machine and that cause the machine to perform any one or more of the methodologies of the various embodiments. The term "machine-readable medium" shall accordingly be taken to include, but not be limited to, solid-state memories, optical and magnetic media, and carrier wave signals.

Figure 6:
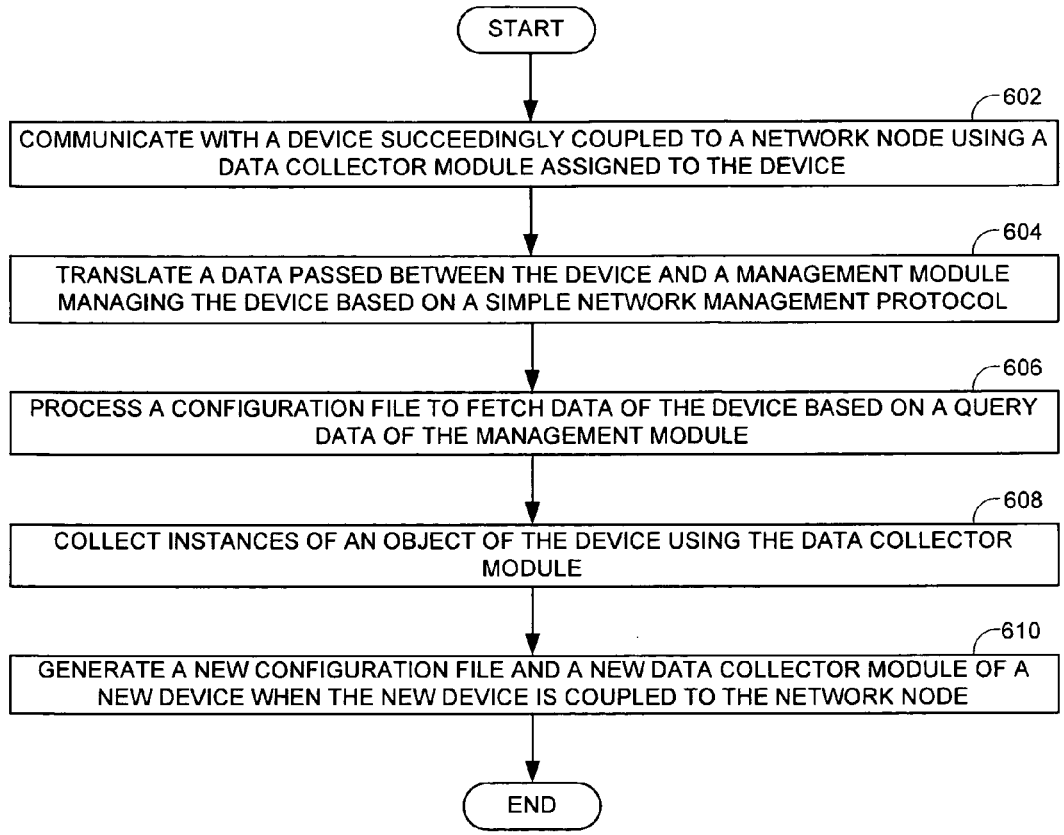
FIG. 6 is a process flow of communicating with the device of FIG. 1 succeedingly coupled to a network node using the data collector module of FIG. 1 assigned to the device, according to one embodiment.

FIG. 6 is a process flow of the generic SNMP module 108 communicating with the device 106 of FIG. 1 succeedingly coupled to a network node using the data collector module 112 of FIG. 1 assigned to the device 106, according to one embodiment. In operation 602, a generic SNMP module (e.g., the generic SNMP module 108) may communicate with a device (e.g., the device 106 of FIG. 1) succeedingly coupled to a network node using a data collector module (e.g., the data collector module 112) assigned to the device. In operation 604, a data (e.g., a query data including a monitor data and a control data, a trap data, etc.) passed between the device and a management module (e.g., the management module 104) managing the device may be translated based on a SNMP.

A configuration file (e.g., the configuration module 114) may be processed to fetch data of the device based on a query data of the management module in operation 606. In operation 608, instances of an object (e.g. the object 206 of FIG. 2) may be collected using the data collector module 112. In operation 610, a new configuration file and a new data collector module of a new device may be generated when the new device is coupled to the network node.

Figure 7:
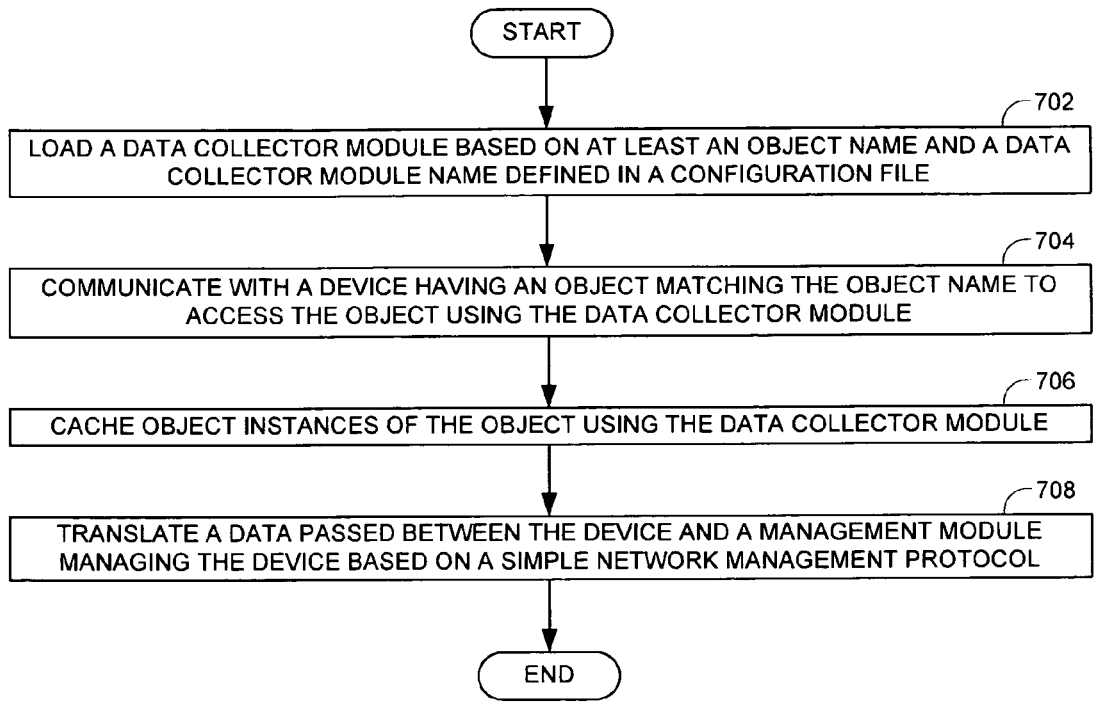
FIG. 7 is a process flow of communicating with the device of FIG. 1 having the object matching the object name of FIG. 2 to access the object using the data collector module of FIG. 1, according to one embodiment.

FIG. 7 is a process flow of the generic SNMP module 108 communicating with the device 106 of FIG. 1 having the object 206 matching the object name 202 of FIG. 2 to access the object 206 using the data collector module 112 of FIG. 1, according to one embodiment. In operation 702, a data collector module (e.g., the data collector module 112 of FIG. 1) based on at least an object name (e.g., the object name 202 of FIG. 2) and a data collector name (e.g., the data collector module name 204) defined in a configuration file (e.g., the configuration module 114) may be loaded.

In operation 704, a device (e.g., the device 106) having an object (e.g., the object 206) matching the object name may be communicated to access the object using the data collector module. In operation 706, object instances (e.g., the object instance(s) 208) of the object may be cached using the data collector module. In operation 708, a data (e.g., a query data including a monitor data and a control data, a trap data, etc.) passed between the device and a management module (e.g., the management module 104 of FIG. 1) managing the device may be translated based on a SNMP.

Figure 8:
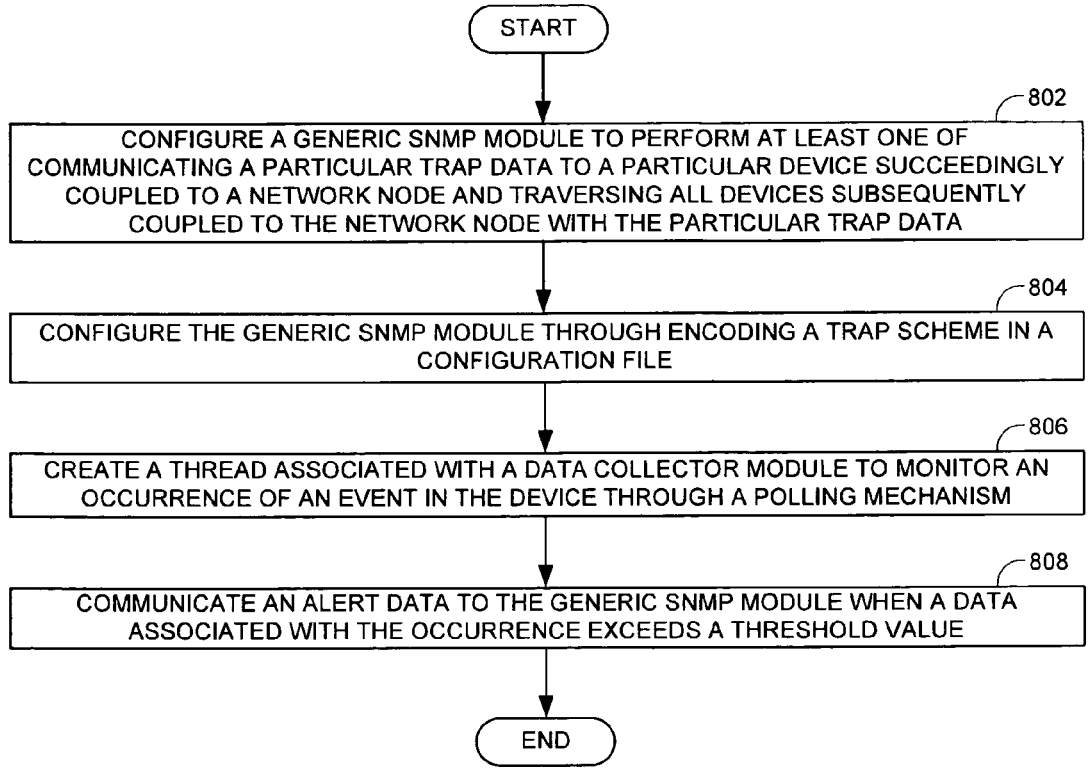
FIG. 8 is a process flow of communication an alert data to the generic SNMP module of FIG. 1 when a data associated with an occurrence exceeds a threshold value, according to one embodiment.

FIG. 8 is a process flow of communicating an alert data to the generic SNMP module 108 of FIG. 1 when a data associated with an occurrence exceeds a threshold value, according to one embodiment.

In operation 802, a generic SNMP module (e.g., the generic SNMP module 108 of FIG. 1) may be configured to perform at least one of communicating a particular tap data (e.g., the trap data 408 of FIG. 4) to a particular device (e.g., the device 106) succeedingly coupled to a network node and traversing all device subsequently coupled to the network node with the particular trap data. In operation 804, the generic SNMP module may be configured through encoding a trap scheme in a configuration file (e.g., the configuration module 114).

In operation 806, a thread associated with a data collector module to monitor an occurrence of an event in the device through a polling mechanism. An alert data (e.g., the alert data 410 of FIG. 4) may be communicated to the generic SNMP module when a data associated with the occurrence exceeds a threshold value in operation 808.

Although the present embodiments have been described with reference to specific example embodiments, it will be evident that various modifications and changes may be made to these embodiments without departing from the broader spirit and scope of the various embodiments. For example, the various devices, modules, engines, analyzers, generators, etc. described herein may be enabled and operated using hardware circuitry (e.g., CMOS based logic circuitry), firmware, software and/or any combination of hardware, firmware, and/or software (e.g., embodied in a machine readable medium).

For example, the management module 104, the generic SNMP module 108, the data collector module 112, and/or the configuration module 114 of FIG. 1, and/or the trap module 406, and/or the thread module 412 of FIG. 4 may be enabled using transistors, logic gates, and electrical circuits (e.g., application specific integrated ASIC circuitry) using a management circuit, a generic SNMP circuit, a data collector circuit, a configuration circuit, a trap circuit, and/or a thread circuit.

In addition, it will be appreciated that the various operations, processes, and methods disclosed herein may be embodied in a machine-readable medium and/or a machine accessible medium compatible with a data processing system (e.g., a computer system), and may be performed in any order. Accordingly, the specification and drawings are to be regarded in an illustrative rather than a restrictive sense.

What is claimed is:

1. A method comprising:
communicating between a plurality of hardware devices and a management module controlling the plurality of hardware devices based on a simple network management protocol (SNMP), the plurality of hardware devices and the management module being coupled through a computer network;
associating, in accordance with the communication, a data collector module based on an object-oriented structure with a hardware device of the plurality of hardware devices through an SNMP module executing on at least one of the hardware device and another hardware device of the plurality of hardware devices coupled to the computer network;
providing a capability to collect a definition of at least one unique object associated with each hardware device of the plurality of hardware devices in a management information database (MIB) associated therewith;
invoking, through the SNMP module, the data collector module to collect instances of the at least one unique object associated with the hardware device based on an object identifier thereof, the instances residing at leaf nodes of a tree data structure of the MIB and the at least one unique object residing at a root node of the tree data structure;
caching the instances of the at least one unique object associated with the hardware device through the data collector module; and
dispensing with a need to modify instructions associated with the SNMP module in accordance with a modification in the MIB associated with the hardware device through the collection of the definition of the at least one unique object in the MIB and the caching of the instances thereof;
wherein the at least one unique object associated with each hardware device of the plurality of hardware devices in the MIB comprises a hardware, a configuration parameter or a performance statistics, which is directly related to a current operation of the device.

2. The method of claim 1, wherein associating the data collector module with the hardware device includes one of:
building the data collector module with a configuration file associated with the hardware device; and
utilizing the built data collector module with the configuration file associated with the hardware device.

3. The method of claim 2, further comprising storing, through the configuration file, at least one of MIB attributes and property information of the hardware device.

4. The method of claim 3, further comprising:
processing the configuration file through the SNMP module to obtain configuration data associated with the hardware device.

5. The method of claim 3, wherein:
the configuration file is stored in a platform independent file format, and the MIB includes a unique set of objects associated with the hardware device.

6. The method of claim 1, further comprising communicating, through the SNMP module, a trap data to the hardware device to detect an error condition therein.

7. The method of claim 2, further comprising newly generating the configuration file when a new hardware device is coupled to the computer network.

8. A system comprising:
a computer network;
a plurality of hardware devices coupled to the computer network;
a management module coupled to the plurality of hardware devices through the computer network;
a set of instructions stored on a memory;
an SNMP module configured to execute the set of instructions on a processor of the at least one hardware device of the computer network, the management module being configured to control the plurality of hardware devices and communicate therewith based on an SNMP,
wherein, in accordance with the communication between a hardware device and the management module, a data collector module based on an object-oriented structure is associated with the hardware device through the SNMP module, the data collector module being configured to be invoked by the SNMP module to collect instances of at least one unique object associated with the hardware device based on an object identifier thereof, and the data collector module also being configured to enable caching of the instances of the at least one unique object associated with the hardware device; and
a MIB having a capability to collect definitions of unique objects associated with the plurality of hardware devices, the collection of the definition of the at least one unique object and the caching of the instances thereof enabling dispensing with a need to modify instructions associated with the SNMP module in accordance with a modification in the MIB associated with the hardware device, the instances residing at leaf nodes of a tree data structure of the MIB and the at least one unique object residing at a root node of the tree data structure;

wherein the at least one unique object associated with each hardware device of the plurality of hardware devices in the MIB comprises a hardware, a configuration parameter or a performance statistics, which is directly related to a current operation of the device.

9. The system of claim 8, wherein the data collector module associated with the hardware device is one of built from a configuration file associated with the hardware device and utilized by the management module when the data collector module associated with the hardware device is available.

10. The system of claim 9, wherein the configuration file of the hardware device is processed through the SNMP module to obtain configuration data associated with the hardware device.

11. The system of claim 10, wherein the configuration file is used to store MIB attributes and property information of the hardware device in a platform independent file format.

12. The system of claim 9, wherein the configuration file is newly generated when a new hardware device is coupled to the computer network.

13. The system of claim 9, wherein the SNMP module is one of a generic and non-generic type, wherein the generic SNMP module is configured to provide a universal interface to the plurality of hardware devices of the computer network, and wherein the non-genetic SNMP module operates on the hardware device when the configuration file does not include information data of the hardware device.

14. A hardware device comprising:
a set of instructions stored on a memory;
an interface to a computer network;
an SNMP module, configured to execute the set of instructions on a processor on the hardware device to facilitate communication between the hardware device and a management module configured to control a plurality of hardware devices coupled to the computer network and communicate therewith based on an SNMP, wherein the hardware device is coupled to the management module through the interface to the computer network, wherein in accordance with the communication, a data collector module based on an object-oriented structure is configured to be associated with the hardware device through the SNMP module, wherein the data collector module is configured to be invoked by the SNMP module to collect instances of a unique object associated with the hardware device based on an object identifier thereof, and wherein the data collector module is also configured to enable caching of the instances of the unique object associated with the hardware device; and a MIB configured to store properties of the unique object associated with the hardware device, which, in conjunction with the caching of the instances of the unique object, is configured to enable dispensing with a need to modify instructions associated with the SNMP module in accordance with a modification in the MIB, the instances residing at leaf nodes of a tree data structure of the MIB and the unique object residing at a root node of the tree data structure;

wherein the at least one unique object associated with each hardware device of the plurality of hardware devices in the MIB comprises a hardware, a configuration parameter or a performance statistics, which is directly related to a current operation of the device.

15. The hardware device of claim 14, wherein the data collector module is one of built with a configuration file associated with the hardware device and utilized by the management module when the data collector module associated with the hardware device is available.

16. The hardware device of claim 15, wherein the configuration file of the hardware device is processed through the SNMP module to obtain configuration data associated with the hardware device.

17. The hardware device of claim 15, wherein the configuration file is used to store MIB attributes and property information of the hardware device in a platform independent file format.

18. The hardware device of claim 14, wherein the SNMP module is configured to communicate a trap data to the hardware device to capture an error condition therein.

19. The hardware device of claim 14, wherein an alert data is communicated to the SNMP module with the occurrence of an event in the hardware device.

20. The hardware device of claim 15, wherein the SNMP module is one of a generic and non-generic type, wherein the generic SNMP module is configured to provide a universal interface to the plurality of hardware devices of the computer network, and wherein the non-genetic SNMP module operates on the hardware device when the configuration file does not include information data of the hardware device.

* * * * *